(12) United States Patent
Antal, Sr. et al.

(10) Patent No.: US 9,163,970 B2
(45) Date of Patent: Oct. 20, 2015

(54) DISPENSER WITH DISCHARGE CONTROL

(71) Applicant: Sonoco Development, Inc., Hartsville, SC (US)

(72) Inventors: Keith E. Antal, Sr., Valatie, NY (US); Chad E. Lagace, Cohoes, NY (US)

(73) Assignee: Sonoco Development, Inc., Hartsville, SC (US)

( * ) Notice: Subject to any disclaimer, the term of this patent is extended or adjusted under 35 U.S.C. 154(b) by 80 days.

(21) Appl. No.: 13/865,245

(22) Filed: Apr. 18, 2013

(65) Prior Publication Data

US 2014/0312075 A1 Oct. 23, 2014

(51) Int. Cl.
*B67B 1/00* (2006.01)
*G01F 11/06* (2006.01)

(52) U.S. Cl.
CPC .................................. *G01F 11/06* (2013.01)

(58) Field of Classification Search
CPC ............ B67D 7/78; B67D 7/84; G01F 11/26; G01F 11/28
USPC .............. 222/167–168.5, 454–456, 437–438, 222/464.1, 464.3, 153.04–153.06, 222/153.13–153.14, 464.7, 189.02–189.11
See application file for complete search history.

(56) References Cited

U.S. PATENT DOCUMENTS

| | | |
|---|---|---|
| 152,909 A | 7/1874 | McSkimin |
| 1,005,130 A | 10/1911 | Andrews |
| 1,046,076 A | 12/1912 | Kennedy |
| 1,155,323 A | 9/1915 | McBroom |
| 1,184,074 A | 5/1916 | Clark |
| 1,261,072 A | 4/1918 | Uyehara |
| 1,270,262 A | 6/1918 | Buckland |
| 1,276,382 A | 8/1918 | Loveland |
| 1,498,491 A | 6/1924 | Stinson et al. |
| 1,523,122 A | 1/1925 | Hellmann |
| 1,707,967 A | 4/1929 | Abbott |
| 1,859,109 A | 5/1932 | Oswell |
| 1,864,936 A * | 6/1932 | Reineking ...................... 222/48 |
| 1,877,808 A | 9/1932 | Cagliostro |
| 1,980,061 A | 11/1934 | Jackson |
| 2,022,031 A | 11/1935 | Fisher |
| 2,025,796 A | 12/1935 | Waldheim |
| 2,084,029 A | 6/1937 | Hochstim |
| 2,088,836 A * | 8/1937 | Brown ........................... 222/42 |
| 2,148,421 A | 2/1939 | Allan |
| 2,173,311 A | 9/1939 | Oelgoetz |
| 2,242,145 A | 5/1941 | Rutkowski |
| 2,243,452 A | 5/1941 | Bickel et al. |
| 2,423,784 A | 7/1947 | Mackey |
| 2,425,142 A | 8/1947 | Brubaker |

(Continued)

*Primary Examiner* — Paul R Durand
*Assistant Examiner* — Andrew P Bainbridge
(74) *Attorney, Agent, or Firm* — Flaster/Greenberg, P.C.

(57) ABSTRACT

A dispenser is provided for a flowable product and is defined by a container body forming a storage chamber. A discharge tube is provided with an inlet positioned adjacent a bottom end of the storage chamber and an outlet positioned adjacent a discharge opening in the container. A sealing member is rotatably secured to the bottom end of the container body and includes a defined first position and defined second position. A closing member is positioned at the inlet end of the discharge tube when the sealing member is in the defined first position. Rotation of the sealing member from the first position to the second position moves the closing member away from the inlet opening and exposes the inlet to product within the storage chamber for selective discharge through the discharge tube outlet and the discharge opening.

16 Claims, 6 Drawing Sheets

(56) References Cited

U.S. PATENT DOCUMENTS

| | | | |
|---|---|---|---|
| 2,515,735 | A | 7/1950 | Saunders |
| 2,538,336 | A | 1/1951 | Smith |
| 2,665,036 | A | 1/1954 | Riva |
| 2,692,708 | A | 10/1954 | Frey |
| 2,704,623 | A | 3/1955 | Yasso |
| 2,778,544 | A | 1/1957 | King |
| 2,794,580 | A | 6/1957 | King |
| 2,815,153 | A | 12/1957 | McCarthy |
| 2,857,083 | A | 10/1958 | Masterson |
| 2,873,050 | A | 2/1959 | Halverson |
| 2,877,937 | A | 3/1959 | Weir |
| 2,989,216 | A | 6/1961 | Moro-Lin |
| 3,023,937 | A | 3/1962 | Matter |
| 3,115,993 | A * | 12/1963 | Ludwig .................. 222/456 |
| 3,148,804 | A | 9/1964 | James |
| 3,172,580 | A | 3/1965 | Mackey |
| 3,201,009 | A * | 8/1965 | Smith ..................... 222/443 |
| 3,211,334 | A | 10/1965 | McShea |
| 3,327,905 | A | 6/1967 | Gould |
| 3,342,383 | A | 9/1967 | Klygis et al. |
| 3,344,962 | A | 10/1967 | Popivalo |
| 3,347,415 | A | 10/1967 | Strom |
| 3,398,857 | A | 8/1968 | Alio |
| 3,648,900 | A | 3/1972 | Voigt |
| 3,687,341 | A | 8/1972 | Stanley et al. |
| 3,756,479 | A | 9/1973 | Croyle et al. |
| 4,144,989 | A | 3/1979 | Joy |
| 4,424,921 | A | 1/1984 | Feuerstein et al. |
| 4,533,070 | A | 8/1985 | Deininger et al. |
| 4,674,660 | A | 6/1987 | Botto |
| 4,728,011 | A | 3/1988 | Schuster et al. |
| 4,779,771 | A | 10/1988 | Song |
| 4,828,149 | A | 5/1989 | Hester |
| 4,871,095 | A | 10/1989 | Song |
| 4,969,585 | A | 11/1990 | Hester |
| 5,018,644 | A | 5/1991 | Hackmann et al. |
| 5,108,006 | A | 4/1992 | Tieke et al. |
| 5,186,366 | A * | 2/1993 | Meisner et al. .............. 222/158 |
| 5,280,846 | A * | 1/1994 | Lonnecker .................. 222/41 |
| 5,303,750 | A | 4/1994 | Sternheimer et al. |
| 5,497,916 | A | 3/1996 | Hester |
| 5,588,563 | A | 12/1996 | Liu |
| 5,711,463 | A | 1/1998 | Chen et al. |
| 5,839,619 | A | 11/1998 | Willer |
| 5,855,300 | A | 1/1999 | Malki |
| 5,947,329 | A * | 9/1999 | Bailey ..................... 221/288 |
| 6,010,042 | A | 1/2000 | Boucher et al. |
| 6,189,742 | B1 | 2/2001 | Thomson et al. |
| 6,419,130 | B1 | 7/2002 | Chen |
| 6,929,158 | B2 | 8/2005 | Smiley |
| 6,948,641 | B1 * | 9/2005 | Williams .................. 222/456 |
| D536,578 | S | 2/2007 | Graham et al. |
| 7,549,816 | B2 | 6/2009 | Glynn et al. |
| 8,573,440 | B2 * | 11/2013 | Wollach ..................... 222/1 |

* cited by examiner

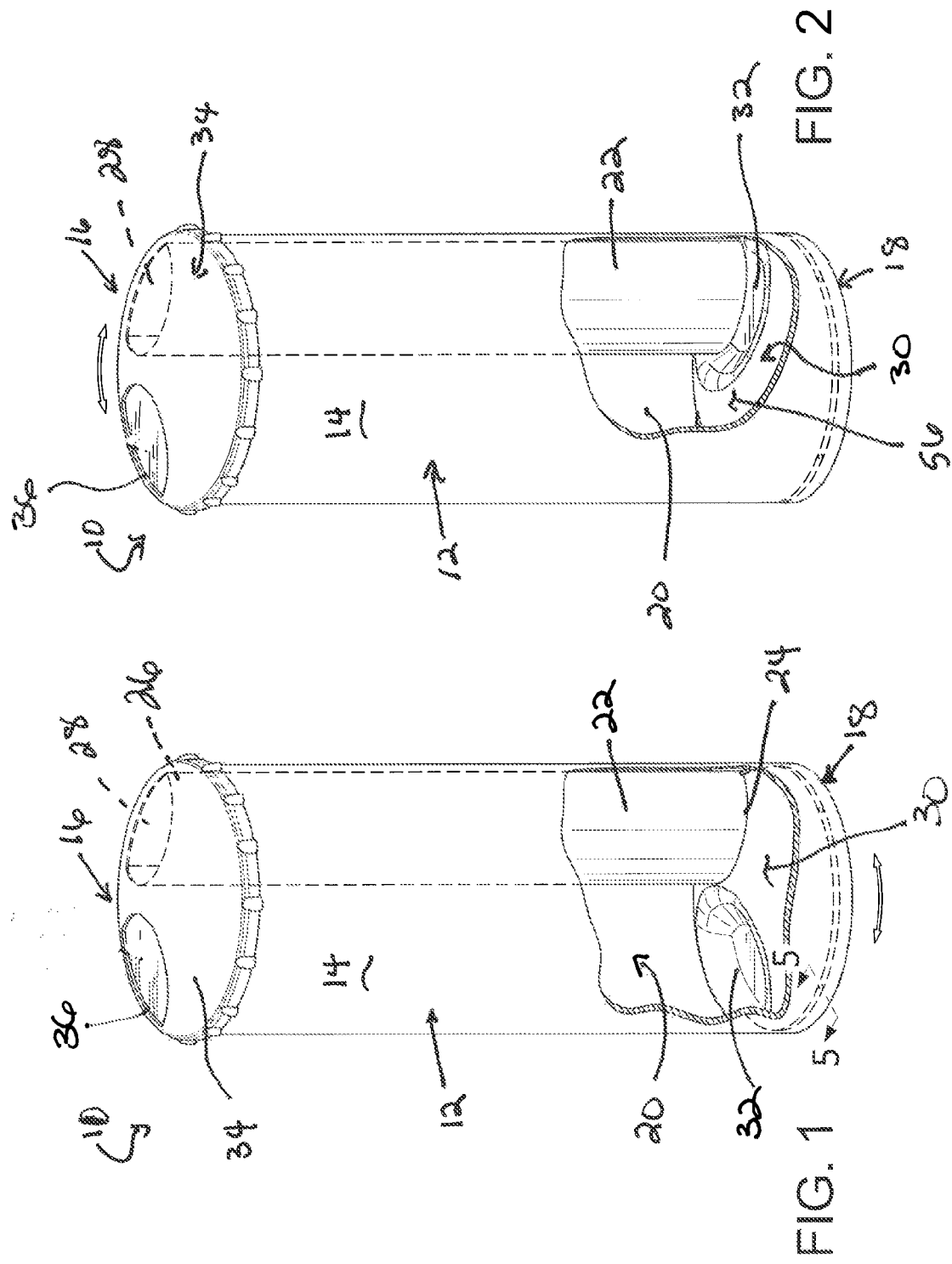

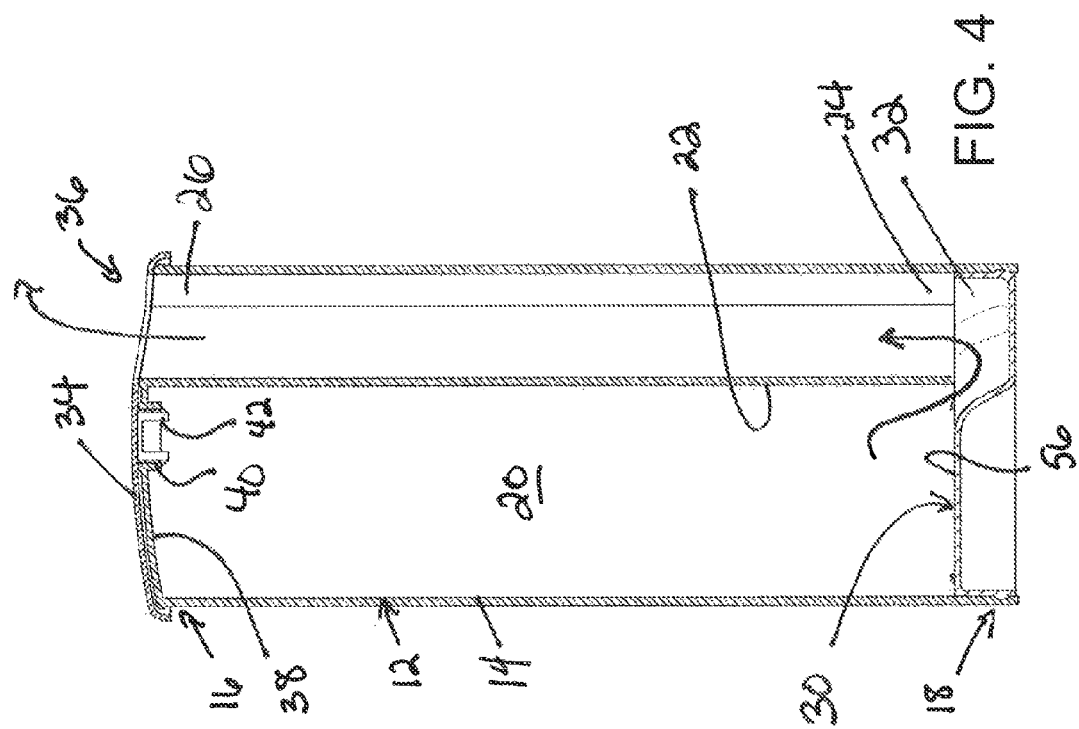
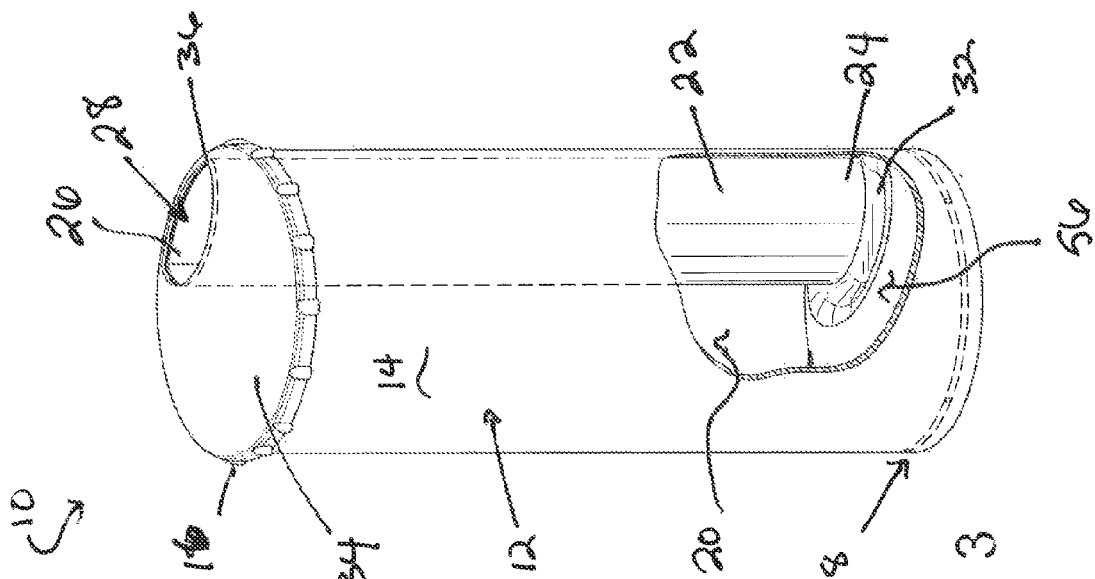

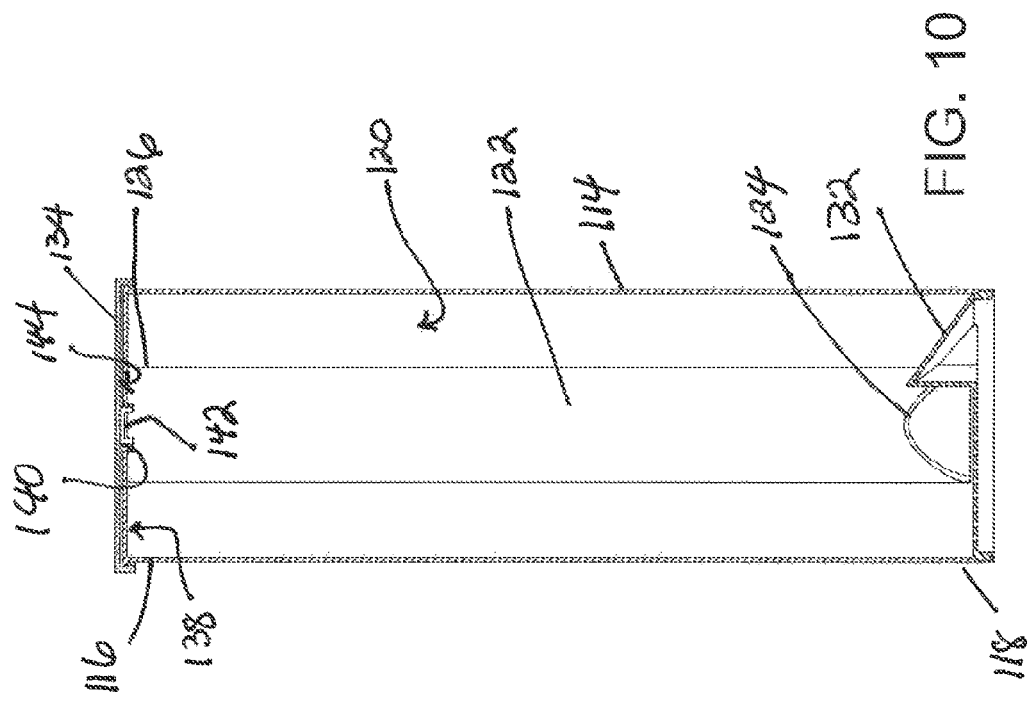
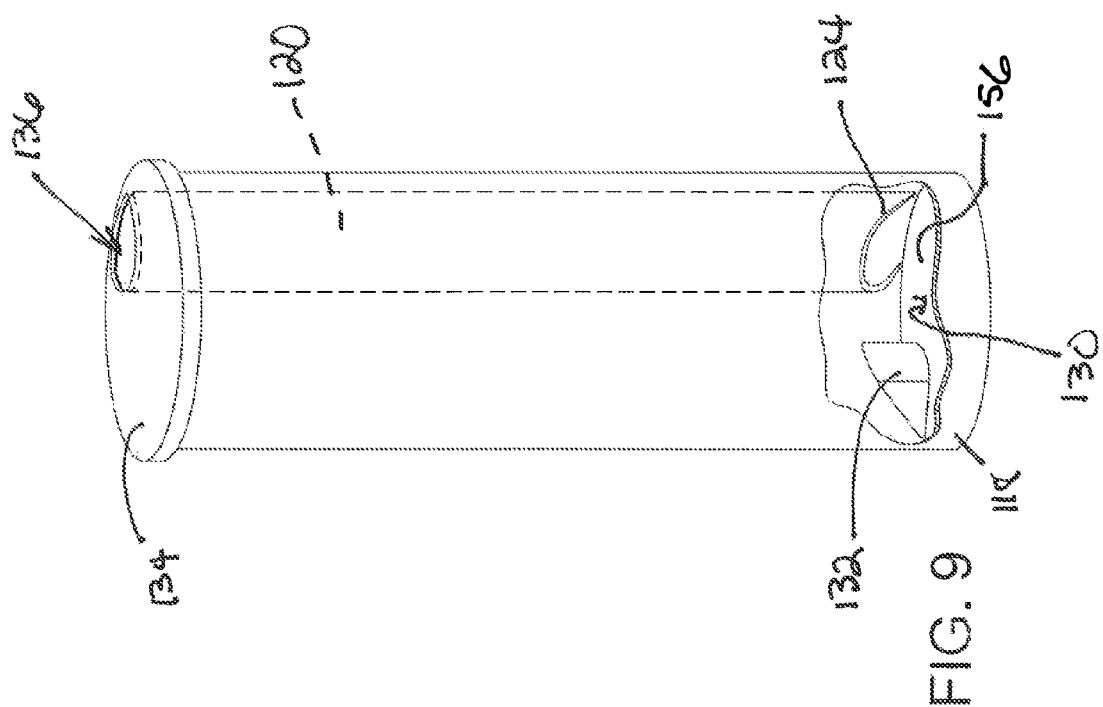

DISPENSER WITH DISCHARGE CONTROL

FIELD OF THE INVENTION

The present disclosure relates to a dispenser for retaining and discharging a flowable product, such as a granular or powdered material. The dispenser is further contemplated to include a control for the discharge of the product.

BACKGROUND

A number of forms of dispensers are known, including those having a closed position and a separate dispensing position, whereby discharge of the retained product may occur.

U.S. Pat. No. 2,665,036 to Riva shows a dispensing device having a container, a top cap and a angled discharge tube extending from the cap into the container. The projected end of the tube includes a receptacle for capturing a dose of product from the retaining chamber. Turning the dispenser up-side-down discharges the dose of material through the tube. The base of the container includes an inner cavity formed on the side wall. The receptacle mates with the cavity to define the discharge dose. Rotation of the cap relative to the container causes the receptacle to move away from the inner cavity, filling the cavity and closing the receptacle against the side wall of the container. A return rotation of the cap repositions the receptacle over the cavity.

U.S. Pat. No. 1,707,967 to Abbott shows a metering dispenser having a central pocket in a bottom wall of a product retaining chamber. A central tube depends from the cap that covers the container. The open bottom end of the tube is positioned over the pocket. Material fills into the pocket around the side edges of the tube. Turning the dispenser up-side-down causes the material within the pocket to be discharged through the tube.

U.S. Pat. No. 3,347,415 to Strom shows a metering dispenser for a fluid with an outer container, a central extraction tube and a metering block at the base of the container. The metering block includes various size cavities for retaining a dose of fluid. The tube is rotated to position an angled passageway over the top of the desired cavity to define the dose of fluid to be discharged from the container. Once the dose is removed from the cavity, the retained portion of fluid in the container refills the cavity.

U.S. Pat. No. 5,186,366 to Meisner et al shows a dispenser having a metering trap at the base for defining a dose of product to be dispensed. The container includes a discharge tube that is positioned along one side wall. The tube is open at the bottom end. The trap is a rotatable member forming the bottom wall of the container. The trap includes a number of chambers that are filled with the product from within the container. Rotation of the trap positions the discharge tube over one of the chambers. Turning the container up-side-down causes discharge of the material in the chamber through the discharge tube. Further rotation of the trap refills the chamber and positions the discharge tube over another chamber.

U.S. Pat. No. 1,276,382 to Loveland shows a dispensing device having an axially moveable discharge tube positioned along one side of a container. The discharge tube communicates with a casing formed on the bottom wall of the retaining chamber of the device. The front wall is open to the chamber, such that product in the chamber may fill the casing when the discharge tube is in a lifted position. The discharge tube includes an extended flange at its bottom end. Rotation of the tube about its central axis, may position the flange to close the front opening in the casing. Lifting of the tube (axially) opens the casing for filling of material therein. Turning the device up-side-down discharges a product dose through the discharge tube. Bumps are formed on the outside wall of the tube to define a set position for the tube and to control the size of the opening in the casing and size of the discharge dose.

SUMMARY OF THE INVENTION

In one aspect of the disclosure, a dispenser is provided for storing and dispensing a flowable product, such as a granular or powdered material. The dispenser includes a body defining a storage chamber. A discharge tube is provided within the body and includes an inlet communicating with the storage chamber and positioned adjacent a bottom end of the storage chamber. An outlet for the tube is positioned adjacent a discharge opening in the storage chamber. A sealing member is rotatably secured to the bottom end of the container body and includes a defined rotational first position and a defined rotational second position. A closing member is positioned at the inlet end of the discharge tube when the sealing member is in the first position. Rotation of the sealing member from the first position to the second position exposes the inlet to product within the storage chamber for selective discharge through the discharge tube.

In a further aspect of disclosure, a dispenser for flowable product is provided having a container body defining a storage chamber for retaining the product. The container body includes a side wall portion, a top end and an open bottom end. A discharge opening is provided in the top end of the container body. A discharge tube is provided within the storage chamber. The discharge tube includes an inlet end positioned adjacent the open bottom end of the container body and an outlet forming the discharge opening at the top end. A sealing member is rotatably secured to the bottom end and defines the bottom wall for the storage chamber. The rotation of the sealing member includes a defined first position and a defined second position. Means is provided for closing the inlet end of the discharge tube when the sealing member is in the defined first position. The rotation of the sealing member from the first position to the second position moves the closing means away from the inlet opening and exposes the inlet to the product within the storage chamber, for selective discharge through the discharge tube.

In a further aspect of the dispenser, a dosing compartment is formed in the sealing member for receiving product from the storage chamber. The dosing compartment is movable with the rotation of the sealing member and in the second position is aligned with the inlet end of the discharge tube.

In a further aspect of the dispenser, a cap member is rotatably mounted on the top end of the container body. The cap preferably includes at least one opening therein, with the opening being movable into alignment with the discharge opening and the outlet end of the discharge tube.

In a further aspect of the dispenser, the discharge tube may be attached to or formed within the side wall of the container body. Further, the container body and the discharge tube may each be formed as an open ended cylinder.

In a further aspect of the dispenser, the sealing member may be slidingly retained within a groove formed on the inside of the side wall of the container body. The sealing member may further include a projection. The inside of the side wall of the container body may include at least one slot aligned for receipt of the sealing member projection to lock the sealing member in the first position. Still further, the inside of the side wall of the bottom end of the container body may include a second slot aligned for receipt of the sealing member projection to lock the sealing member in the second position.

In a further aspect of the dispenser, the sealing member may include an activation handle for causing the rotation of the member within the bottom end. In a still further aspect of the dispenser, the closing means may be formed as part of the sealing member. The closing means may be formed as an upward projection from the sealing member. Further, the upward projection may be defined as an angled surface. Still further, the inlet end of the discharge tube may include an angled opening, with the angled surface of the upward projection conforming to and closing the angle opening of the discharge tube in the first position.

In another aspect of the dispenser, the closing means may be defined by a portion of the bottom wall of the sealing member. Further, a dosing compartment may be formed in the bottom wall of the sealing member. The dosing compartment is formed for receiving product from the storage compartment and movable with the rotation of the sealing member, such that the dosing compartment in the second position is aligned with the inlet end of the discharge tube.

In a further aspect of the disclosure, a dispenser is provided for a flowable product, with the dispenser having a container body defining a storage chamber for retaining product. The container body includes a tubular side wall, a top end and bottom end. A discharge opening is provided in the container body and a discharge tube is provided within the storage chamber. The discharge tube includes an inlet end positioned adjacent the bottom end of the container body and an outlet positioned adjacent the discharge opening. A rotatable member is secured to the bottom end and is movable from a releasable first position to a second position. The rotatable member serves to close the inlet end of the discharge tube when in the first position. Rotation of the member from the first position to the second position opens the inlet end of the discharge tube to permit selective discharge of product through the discharge tube outlet and out of the discharge opening.

BRIEF DESCRIPTION OF THE DRAWINGS

For the purpose of illustrating the invention, there is shown in the drawings a number of forms that are presently preferred; it being understood that the invention is not limited to the precise arrangements and instrumentalities shown.

FIG. 1 is an isometric view of a first embodiment of a dispenser shown in a first operative position, with a portion of the outside surfaces removed to show interior structures.

FIG. 2 is an isometric view of the first embodiment of the dispenser of FIG. 1 shown in a second position.

FIG. 3 is an isometric view of the first embodiment of the dispenser shown in a further operative position.

FIG. 4 is a cross sectional view of the first embodiment of the dispenser shown in the position of FIG. 3.

FIG. 9 is an isometric view of the second embodiment of the dispenser shown in a third position.

FIG. 10 is a cross sectional view of the second embodiment of the dispenser shown in the third position of FIG. 9.

DETAILED DESCRIPTION

Figure 5:
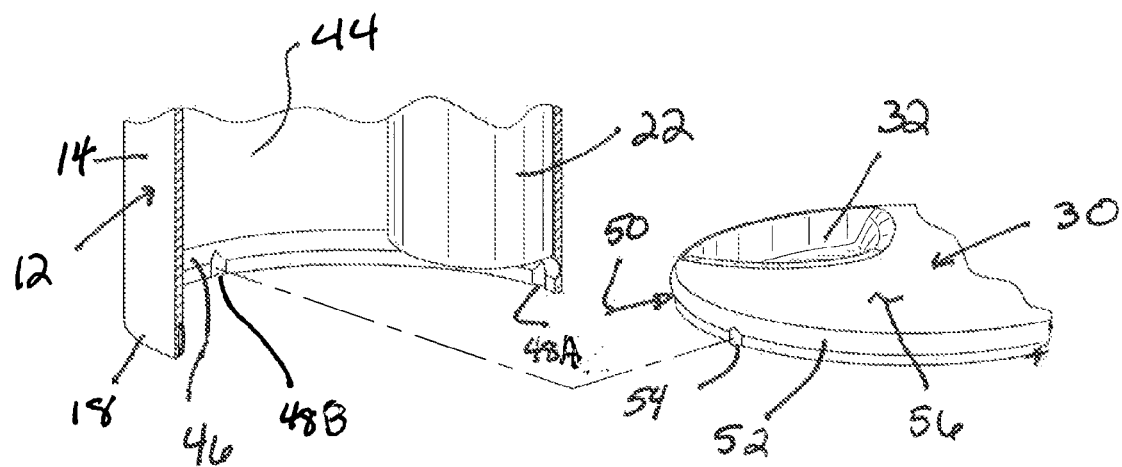
FIG. 5 is a cut-away and exploded view of a portion of the first embodiment of the dispenser shown in FIGS. 1-4.

Referring now to the drawings, where like numerals identify like elements, there is shown in FIG. 1 a dispenser, which is generally referred to by the numeral 10. The dispenser 10 includes a container body 12 having a side wall 14, a top end 16 and a bottom end 18. The container body 12 defines an internal storage chamber 20. A discharge tube 22 is positioned within the chamber 20. The tube 22 is shown as attached to the inside surface of the side wall 14. An inlet end 24 of the tube 22 is positioned adjacent the inside surface of the bottom end 18. A top end 26 of the tube 22 is positioned adjacent the top end 16 of the container body 12 and defines a discharge opening 28.

A sealing member 30 is rotatably secured within the bottom end 18 of the container body 12. The sealing member 30 forms the bottom wall of the storage chamber 20. A dosing compartment 32 is provided in the bottom wall of the sealing member 30 and is movable with the rotation of the sealing member 30. A cap member 34 is rotatably mounted on the top end 16 of the container body 12. The cap 34 includes an outlet opening 36, which is moveable along with the cap 34 and which may be aligned with the discharge 28 in the top end 26 of the tube 22.

In FIG. 1, the sealing member 30 is positioned with the dosing compartment 32 aligned away from the inlet end 24 of the discharge tube 22. Based on the form and position of the inlet end 24 of the tube 22, the sealing member 30 serves to close the tube 22. As shown in FIG. 1, the dispenser 10 is in a closed or sealed position. The cap 34 is rotated to place the outlet opening 36 out of alignment with the discharge 28 at the top end 16 of the tube 22. Hence, the inlet end 24 and discharge opening 28 of tube 22 in this first operative position of FIG. 1 are closed and/or sealed.

In FIG. 2, the sealing member 30 on the bottom end 18 of the container body 12 is rotated to a second position such that the dosing compartment 32 is aligned with the inlet end 24 of the tube 22. The dosing compartment 32 is formed to be generally wider than the inlet end 26 of the tube 22. Material retained within the storage chamber 20 normally flows into the dosing chamber 32, around the inlet end 26 of the tube 22 (when the dispenser 10 is in the upright position, as shown in FIGS. 1-4).

In FIG. 3, the delivery cap 34 is rotated into an open position, such that the outlet opening 36 is aligned with the discharge 28 in the top end 16 of the tube 22. The alignment of the tube 22 with the dosing compartment 32 and the outlet opening 36 in the cap 34 is also shown in the cross section of FIG. 4. A passageway is formed by the alignment of the parts and is represented by the arrows in FIG. 4. Material from the storage chamber 20 fills the dosing compartment 32 in the sealing member 30, when the dispenser 10 is in the upright position. Rotation or inversion of the dispenser 20 causes the material dose in the chamber 20 to move into and through the tube 22, discharging through the outlet opening 36. During rotation, the remaining material in the storage chamber 20 moves into the chamber and is blocked from discharge by the cap member 34.

As shown in the cross section of FIG. 4, the top end 16 of the container body 12 includes a fixed wall 38. The wall 38 is preferably sealed to the side wall 14 and to the top end 26 of the discharge tube 22. It may be possible to form the side wall 14, tube 22 and fixed wall 38 as a single molded part. A receiving opening 40 is formed in the fixed wall 38 and received a rotary projection 42 attached (or formed as part of) to the bottom surface of the cap member 34. The projection 42 is press fit into the opening 40 and the cap is rotatably fixed to the wall 38 on the top end 18 of the container body 12. The tolerances of part formation is contemplated to be such that, when the cap 34 is rotated into the closed position (FIGS. 1 and 2), the discharge 28 of the tube 22 is closed (and preferable sealed) to prevent discharge (or leaking) of material from the dispenser 10.

Figures 6A, 6B:
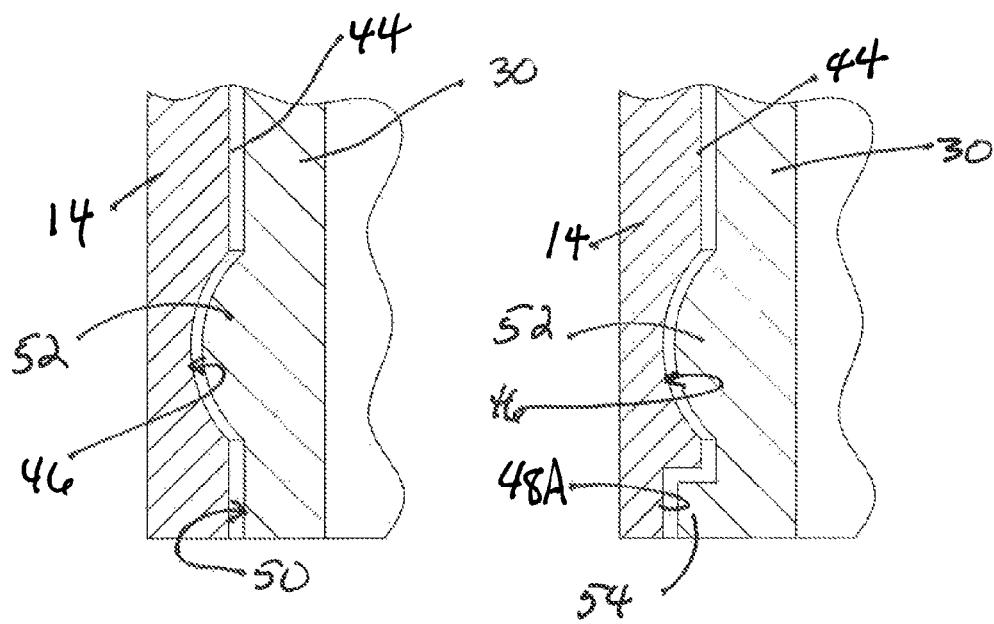
FIGS. 6A and 6B are partial cross sectional views of a bottom portion of the dispenser of FIGS. 1-5.

The fixing of the sealing member 30 within the bottom end 18 of the container body 12 is shown in FIGS. 5-6B. The sealing member 30 is shown in FIG. 5 to be a disk shaped element that is inserted into the round opening formed by the bottom end 18 of the side wall 14. The inside surface 44 of the side wall 14 includes an annular channel 46 and two receiving grooves 48A, 48B. The peripheral edge 50 of the sealing member 30 includes an annular projection 52 that generally conforms to the dimensions of the channel 46 in the inside wall surface 44. In addition, a projecting nub 54 is provided on the peripheral edge 50 of the member 30, adjacent the annular projection 52.

The engagement between the projection 52 and the channel 46 is shown in the partial assembly of FIG. 6B. The annular projection 52 is formed on the outer periphery 50 of the sealing member 30. The member 30 is inserted into the open, bottom end 18 of the side wall 14 of the container body 12. Upon insertion, the projection 52 is received within the channel 46 is formed on the inside surface 44 of the side wall 14. The projecting nub 54 engages within one of the receiving grooves 48A, 48B, depending on the setting for the sealing member 30. The engagement of the nub 54 within one of the grooves 48 is shown in cross section in FIG. 6B. In the sealed position, such as FIG. 1, the nub 54 is engaged within groove 48A. The positioning of the nub 54 in groove 48A locates the dosing compartment away from the inlet end 24 of the tube 22. Hence, the tube 22 is closed by the planer surface portion 56 of the sealing member 30. In the secondary position, the nub 54 is engaged in the groove 48B, positioning the dosing compartment 32 below the inlet 24 of the tube 22. This secondary position of the sealing member 30 is shown in FIGS. 2-4.

The inside surface (44) of the side wall (14) is preferably dimensioned to permit the movement of the projecting nub (54) along the wall during rotation of the sealing member 30 between the first and second positions. Further, the surfaces of the nub and grooves may be formed to create a stop, preventing rotation of the sealing member (30) beyond the desired rotational position of the groove. As such, the sealing member will rotate only between the positions of the grooves. Further, the groove and nub engagement may serve to lock the nub (54) within the second groove (48B), deterring a return rotation back to the first position. A tamper evident structure may be provided to confirm the positioning of the dispenser in the first position (FIG. 1). A sealing label or an integral bridge may form a connection between the side wall (14) and the member (30) may be provided. The connection indicates that the two parts have remained in the sealed position. Once rotation of the sealing member has occurred to move the dosing chamber to the second position, the connection is broken.

Figure 8:
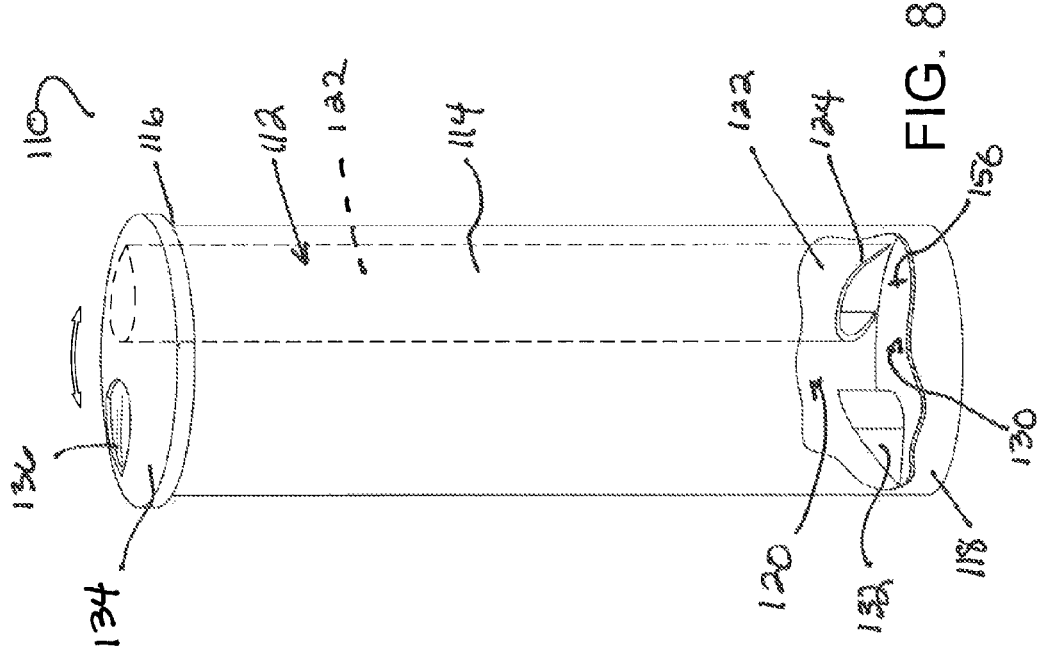
FIG. 8 is an isometric view of the second embodiment of the dispenser shown in a second position.
Figure 7:
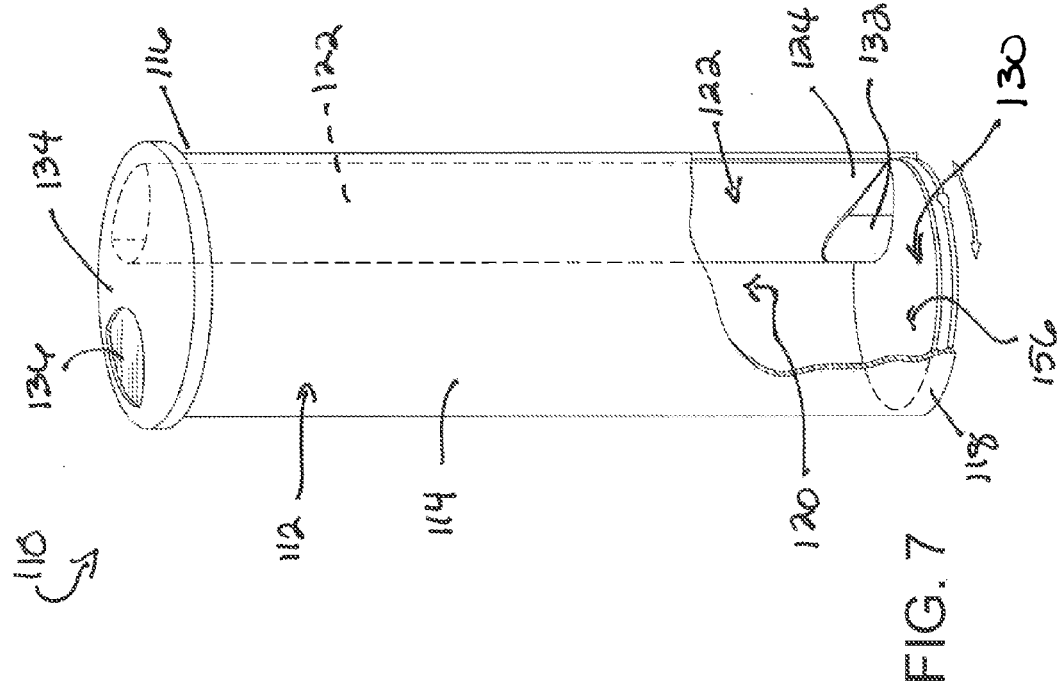
FIG. 7 is an isometric view of a second embodiment of a dispenser shown in a first operative position, with a portion of the outside surfaces removed to show interior structures.

A further dispenser embodiment is disclosed in FIGS. 7-11. The dispenser 110 is formed by a container body 112 having a side wall 114, a cap member 134 and a bottom sealing member 130. A discharge tube 122 is provided within a storage chamber 120. The container body 112 and extends from the sealing member 130 to the top end 116 of the side wall 114. The cap member 134 is rotationally mounted on the top end 116 of the body 112 and includes an outlet opening 136 therein. The inlet end 124 of the tube 122 includes an angled edge. A closing member 132 projects from the planer surface 156 of the sealing member. The closing member 132 includes an angled surface that conforms to the angled edge of the tube inlet 124. In FIG. 7, the closing member 132 is aligned with the inlet 124 of the tube 122, with the surfaces of the elements in contact and sealing the tube 122. As shown in FIG. 8, rotation of the sealing member 130 relative to the side wall 114 separates the closing member 132 from the tube 122, opening the inlet end 124 of the tube 122. In FIG. 9, the cap member 134 is rotated to position the discharge 128 of the tube 122 in alignment with the outlet opening 136 of the cap 134. The removal of the closing member 132 from the tube inlet 124 and the opening the discharge 128 creates a discharge passageway for material retained within the storage chamber 120. Tilting or inversion of the dispenser 110 directs a controlled dose of material from the chamber 120, through the tube 122 and out of the discharge opening 136.

In FIG. 10, a cross section of the body 112 of the dispenser 110 shows the relative positioning of the closing member 132 with the tube inlet 124 in the open or second position of the sealing member 130. In addition, the container body 112 is shown to include an upper or fixed wall 138 attached to the top end 116 of the side wall 114. A receiving opening 140 is formed within the upper wall 138, and receives a projection 142 formed on the inside surface 144 of the cap 134.

Figure 11:
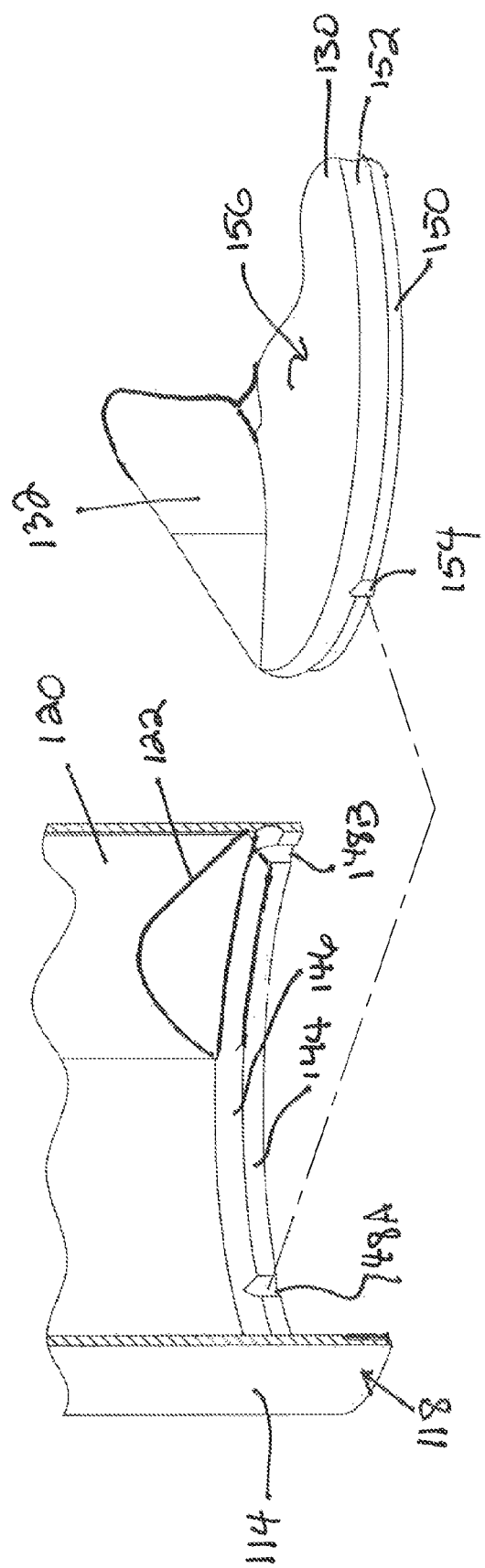
FIG. 11 is a cut-away and exploded view of a portion of the second embodiment of the dispenser shown in FIGS. 7-10.

The fixing of the sealing member 130 within the bottom end 118 of the container side wall 114 is shown in FIG. 11. The sealing member 130 is a disk shaped element that is inserted into a round opening formed by the side wall 114. The inside surface 144 of the side wall 114 includes an annular channel 146 and two receiving grooves 148A, 148B. The peripheral edge 150 of the disk 130 includes an annular projection 152 that generally conforms to the dimensions of the channel 146 formed in the inside surface 144. A projecting nub 154 is provided on the peripheral edge 150 of the sealing disk 130, adjacent the annular projection 152.

The projection 152 engages within the channel 146. Upon insertion, the projection 152 is received within the channel 146 formed on the inside surface 144 of the side wall 114. The nub 154 engages within one of the receiving grooves 148A, 148B, depending on the desired position of the sealing member 130. In the first or sealed position, such as FIG. 7, the nub 154 is engaged within groove 148A. This position of the nub 154 locates the closing member 132 in alignment with the inlet end 124 of the tube 122. Hence, the tube 122 is closed by the angled surface of the closing member 132. In the second position, such as FIGS. 8-10, the nub 154 engages the groove 48B, positioning the dosing compartment 32 below the inlet 24 of the tube 22. The inside surface 144 of the side wall 114 is (again) preferably dimensioned to permit movement of the nub 154 along the wall during rotation of the sealing member 130 between the first and second positions. Further, the nub and grooves or other structures may be formed to create a stop, preventing rotation of the sealing member beyond the desired rotational position or a return rotation. A tamper evident structure may be provided to confirm that the sealing member has not been moved out of the first position (FIG. 7). Once rotation of the sealing member has moved the projection to the second position (FIGS. 8-10), a connection is broken, indicating a prior opening of the container.

The dispenser of the present disclosure may be formed from any number of materials, with an injection molded plastic construction being preferred. The sealing member (30, 130) is preferably press fit within the open bottom end of the container body (12, 112). A flange or other gripping member may be provided on the bottom surface of the sealing member to provide means for rotation between the first (closed) and second (open) positions. A rotation structure may also be provided on the cap member (such as the gripping nubs shown on the periphery of cap 34). The discharge tube (22, 122) may be integrally formed with the side wall (14, 114) of the container body (12, 112) or may be a separately formed element that is (preferably) secured within the chamber defined by the container body. Other features and structures may be added or subtracted from the structures shown without departing from the function and advantages contemplated by the present disclosure.

In the drawings and specification, there has been set forth a number of embodiments and, although specific terms are employed, these terms are used in a generic and descriptive sense only and not for purposes of limitation. The scope of the invention is set forth in the following claims.

What is claimed is:

1. A dispenser for a flowable product comprising:
   a container body defining a storage chamber for retaining product, the container body having a side wall portion, a top end, and an open bottom end;
   a discharge opening provided in the top end of the container body;
   a discharge tube provided within the storage chamber, the discharge tube having an inlet end positioned adjacent the open bottom end and an outlet positioned adjacent the discharge opening in the top end;
   a sealing member rotatably secured to the bottom end, said sealing member defining a bottom wall for the storage chamber, rotation of the sealing member having defined first and second positions; and
   means for closing the inlet end of the discharge tube when the sealing member is in the defined first position,
   means for limiting rotation of the sealing member between the first and second positions and for fixedly locking the sealing member in the second position upon rotation thereto, preventing rotation beyond the defined second position and preventing return rotation to the first position,
   wherein rotation of the sealing member from the first position to the second position moves the closing means away from the inlet opening and exposes the inlet to the product within the storage chamber for selective discharge of the product from the storage chamber, through the discharge tube outlet end.

2. The dispenser as claimed in claim 1 further comprising a dosing compartment formed in the sealing member and formed for receiving product from the storage chamber, the dosing compartment movable with the rotation of the sealing member, wherein the dosing compartment in the second position is aligned with the inlet end of the discharge tube.

3. The dispenser as claimed in claim 1 further comprising a cap member rotatably mounted on the top end, the cap having at least one opening therein movable into alignment with the outlet end of the discharge tube.

4. The dispenser as claimed in claim 1 wherein said discharge tube is attached to the inside of the side wall of said container body.

5. The dispenser as claimed in claim 1 wherein the container body and the discharge tube are each formed as an open ended cylinder.

6. The dispenser as claimed in claim 1 wherein the sealing member is slidingly retained within a groove in the inside of the side wall of the container body.

7. The dispenser as claimed in claim 1 wherein the limiting means comprises a projecting nub formed on the sealing member, and the inside of the side wall of the bottom end comprises at least one groove aligned for receipt of the projecting nub to releasably lock the sealing member in the first position.

8. The dispenser as claimed in claim 7 wherein the inside of the side wall of the bottom end comprises a second slot aligned for receipt of the nub in the second position to fixedly lock the sealing member in the second position.

9. The dispenser as claimed in claim 1 wherein the closing means is formed as part of the sealing member.

10. The dispenser as claimed in claim 9 wherein the closing means projects upwardly from the sealing member into the storage chamber.

11. The dispenser as claimed in claim 10 wherein the upward projection of the closing means defines an angled surface.

12. The dispenser as claimed in claim 11 wherein the inlet end of the discharge tube comprises an edge, the angled surface of the upward projection conforming to and closing the edge of the discharge tube in the first position.

13. The dispenser as claimed in claim 9 wherein the closing means comprises a portion of the bottom wall of the sealing member.

14. The dispenser as claimed in claim 13 further comprising a dosing compartment provided in the bottom wall of the sealing member, the dosing compartment formed for receiving product from the storage chamber, the dosing compartment movable with the rotation of the sealing member, wherein the dosing compartment in the defined second position is aligned with the inlet end of the discharge tube.

15. A dispenser for a flowable product comprising:
   a container body defining a storage chamber for retaining product, the container body having a tubular side wall, a top end, and a bottom end;
   a discharge opening provide in the container body;
   a discharge tube provided within the storage chamber, the discharge tube having an inlet end positioned adjacent the bottom end and an outlet positioned adjacent the discharge opening;
   a rotatable member secured to the bottom end, the rotatable member being movable by rotation from releasable first position to a defined second position, the rotatable member closing the inlet end of the discharge tube when in the first position; and
   means for limiting rotation of the sealing member between the first and second positions and for fixedly locking the sealing member in the second position and preventing return rotation of sealing member upon rotation to the second position,
   wherein rotation of the member from the first position to the second position opens the inlet end of the discharge tube for selective discharge of product from the storage chamber, through the discharge tube and out of the discharge opening.

16. A dispenser for a flowable product comprising:
   a container body defining a storage chamber, the container body having a bottom end and a discharge opening;
   a discharge tube within the storage chamber having an inlet positioned adjacent the bottom end of the storage chamber and an outlet positioned adjacent the discharge opening; and
   a sealing member rotatably secured to the bottom end body, the rotation of the sealing member having a defined first position and defined second position, the sealing member including a closing member positioned at the inlet end of the discharge tube in the defined first position and rotation of the sealing member away from the first position to the second position moving the closing member away and exposing the inlet to product within the storage chamber for selective discharge through the discharge tube and the discharge opening, and a projecting nub formed on the sealing member, the inside of the side wall of the bottom end comprises at least one groove aligned for receipt of the projecting nub to releasably lock the sealing member in the first position, and the inside of the side wall of the bottom end comprises a second slot aligned for receipt of the nub in the second position, the second slot formed to fixedly lock the sealing member in the second position and to prevent further rotation and return rotation upon receipt of the projecting nub in the second slot.

* * * * *